United States Patent [19]

Kraus et al.

[11] Patent Number: 4,923,177
[45] Date of Patent: May 8, 1990

[54] CONTINUOUS PREHEAT SCRAP CHARGING SYSTEM AND METHOD

[75] Inventors: Richard B. Kraus; Albert Musschoot, both of Barrington, Ill.

[73] Assignee: General Kinematics Corporation, Barrington, Ill.

[21] Appl. No.: 267,572

[22] Filed: Nov. 7, 1988

[51] Int. Cl.$^5$ .............................................. C22B 1/00
[52] U.S. Cl. ....................................... 266/44; 75/581; 266/91; 266/248; 266/249; 266/901; 432/105
[58] Field of Search ............... 75/43, 44 R, 44 S, 46; 266/274, 900, 901, 91, 142, 200, 249, 248, 213; 432/118, 105

[56] References Cited

U.S. PATENT DOCUMENTS

| | | | |
|---|---|---|---|
| 3,750,866 | 8/1973 | Musschoot | 198/767 |
| 3,758,267 | 9/1973 | Berk | 266/901 |
| 3,813,209 | 5/1974 | Venetta | 266/901 |
| 4,299,692 | 11/1981 | Musschoot | 209/1 |
| 4,579,524 | 4/1986 | Kraus | 266/901 |
| 4,709,507 | 12/1987 | Musschoot | 51/7 |

Primary Examiner—Melvyn J. Andrews
Attorney, Agent, or Firm—Wood, Phillips, Mason Recktenwald & Vansanten

[57] ABSTRACT

A continuous preheat charging method including the steps of transferring scrap from a receiving point to a discharge point, preheating scrap adjacent the discharge point prior to delivery of preheated scrap to one of a pair of melting furnaces, and alternately feeding preheated scrap to the pair of melting furnaces. A continuous preheat charging system is also disclosed which includes a scrap charge transfer conveyor having a scrap receiving end and a scrap discharge end together with a weigh feeder station at the scrap receiving end and a preheating station at the scrap discharge end. After scrap is weighed at the weigh feeder station and fed to the transfer conveyor, the scrap is preheated at the preheating station and delivered to a furnace feeder station to be fed on an alternating basis to one of a pair of melting furnaces.

23 Claims, 3 Drawing Sheets

CONTINUOUS PREHEAT SCRAP CHARGING SYSTEM AND METHOD

FIELD OF THE INVENTION

The present invention relates to a continuous preheat charging system and method for preheating scrap prior to delivery to one of a pair of furnaces on an alternating basis.

BACKGROUND OF THE INVENTION

In applications where it is desirable to process scrap materials such as metals for reuse, the metals are typically melted in a gas fired or an induction furnace. The charge is dumped into the furnace where it is melted, but it is known that dumping cold metals into a furnace can cause the furnace temperature to be reduced to an extent which is detrimental to furnace efficiency. Furthermore, when cold metals are dumped into molten metal, there is a danger of explosion due to the moisture which may be present in such cold metals.

Also, different applications require different mixtures of metals rendering it necessary to measure the quantities of each metal being melted. In many cases, a particular composition is first approximated in a batch which is melted after which samples of the batch are analyzed to determine necessary adjustments to obtain the desired composition. In this manner, a selected mix and weight of metals can then be added to make the necessary adjustments but this again involves the problems previously discussed.

Moreover, due to the necessity for a batch-type operation, the processing operation is recognized as characterized by undesirably low efficiency levels. Thus, the cost of the processing operation is increased due to the inability to achieve efficiency levels that approach maximum utilization of space, equipment and personnel. Accordingly, it has remained to provide a continuous preheat charging system and method that would avoid these drawbacks.

The present invention is directed toward overcoming one or more of the problems and accomplishing one or more of the objectives as set forth hereinabove.

SUMMARY OF THE INVENTION

In one aspect of the present invention, a continuous preheat charging method is disclosed. This method includes the steps of transferring scrap from a receiving point to a discharge point, preheating scrap adjacent the discharge point prior to delivery of preheated scrap to one of a pair of melting furnaces, and alternately feeding preheated scrap to a pair of melting furnaces. Further, the method preferably includes the steps of weighing scrap adjacent the receiving point and feeding weighed scrap to the receiving point for transfer to the discharge point.

In addition, the present invention is directed to a continuous preheat charging system which includes means for transferring scrap from a receiving point to a discharge point. The system also includes means for preheating scrap adjacent the discharge point of the transferring means prior to delivery of preheated scrap to one of a pair of melting furnaces, and means for receiving preheated scrap from the preheating means and alternately feeding preheated scrap to a pair of melting furnaces. Additionally the system preferably includes means for weighing scrap adjacent the receiving point of the transferring means and feeding weighed scrap to the receiving point for transfer to the preheating means.

In the preferred embodiment, the weighing and feeding means is a weigh feeder station adjacent the receiving point of the transferring means which is adapted to receive scrap from a scrap supply for first weighing and then feeding scrap to the receiving point of the transferring means. Advantageously, the scrap transferring means is a scrap charge transfer conveyor with the receiving point being a scrap receiving end of the conveyor and the discharge point being a scrap discharge end of the conveyor. Still further, the preheating means is preferably a preheating station adjacent the scrap discharge end of the transfer conveyor which is adapted to receive scrap from the conveyor for preheating prior to delivery to one of the pair of melting furnaces.

Still other objects, advantages and features of the present invention will become apparent from a consideration of the following specification taken in conjunction with the accompanying drawings.

DETAILED DESCRIPTION OF THE PREFERRED EMBODIMENT

Figure 1:
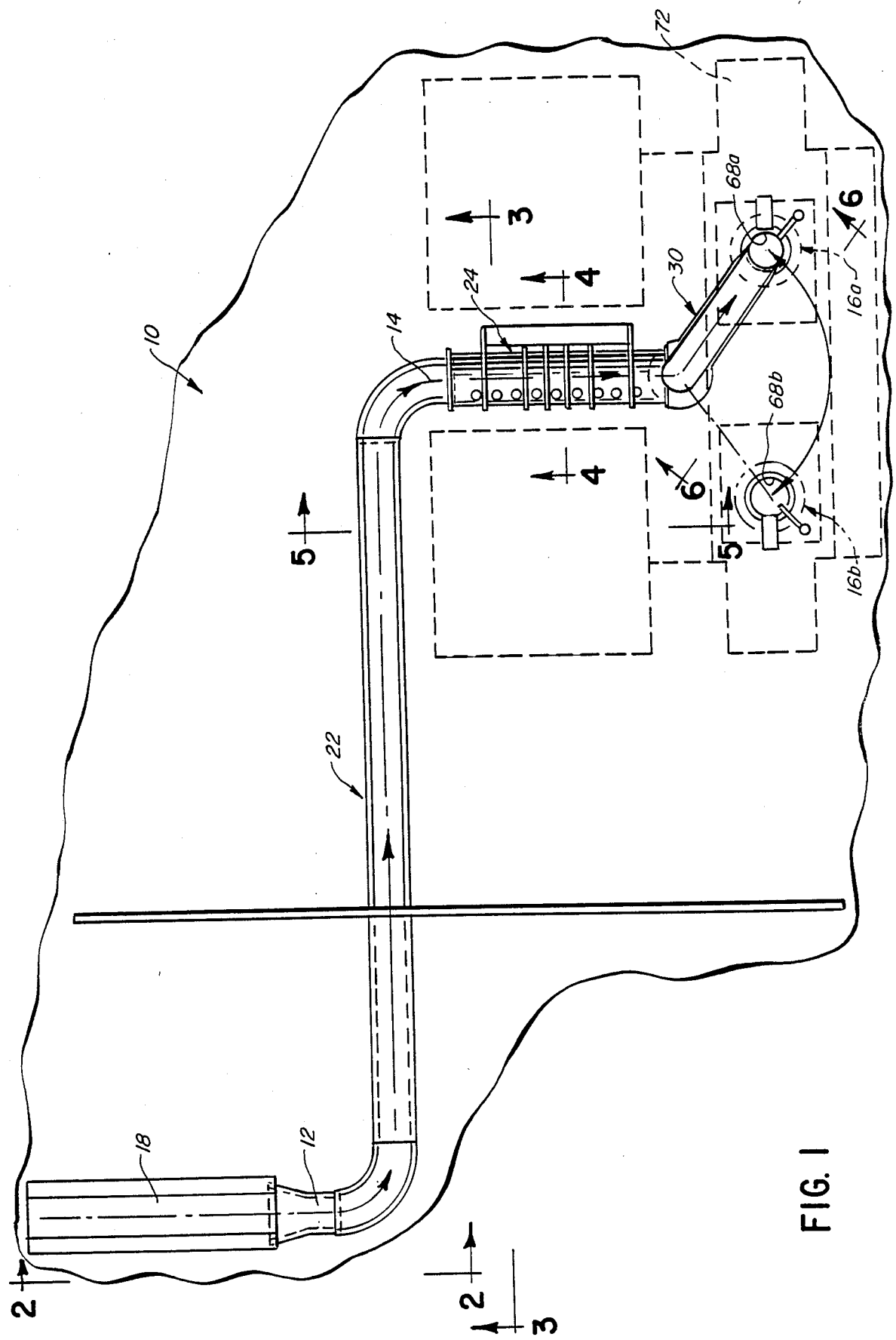
FIG. 1 is a plan view, partially schematic, illustrating a continuous preheat charging system in accordance with the present invention.

Referring first to FIG. 1, a continuous preheat charging system 10 of the present invention is illustrated which includes means for transferring scrap material such as metals from a receiving point 12 to a discharge point 14. The system 10 also includes means for preheating scrap adjacent the discharge point 14 of the transferring means prior to delivery of preheated scrap to one of a pair of melting furnaces 16a and 16b, and means for receiving preheated scrap from the preheating means and alternately feeding preheated scrap to the pair of melting furnaces 16a and 16b. Still further, the continuous preheat charging system 10 preferably includes means for weighing scrap adjacent the receiving point 12 of the transferring means and feeding weighed scrap to the receiving point 12 of the transferring means.

Figure 2:
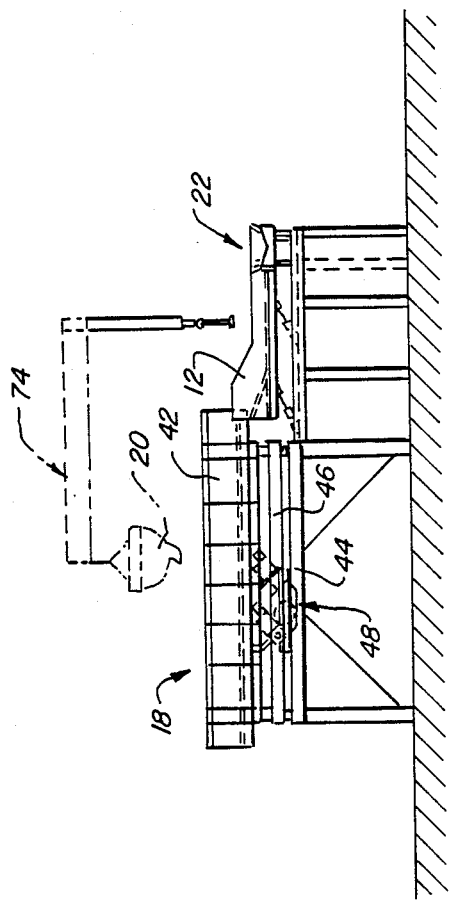
FIG. 2 is a side elevational view of a weigh feeder station taken along the line 2—2 of FIG. 1.
Figure 3:
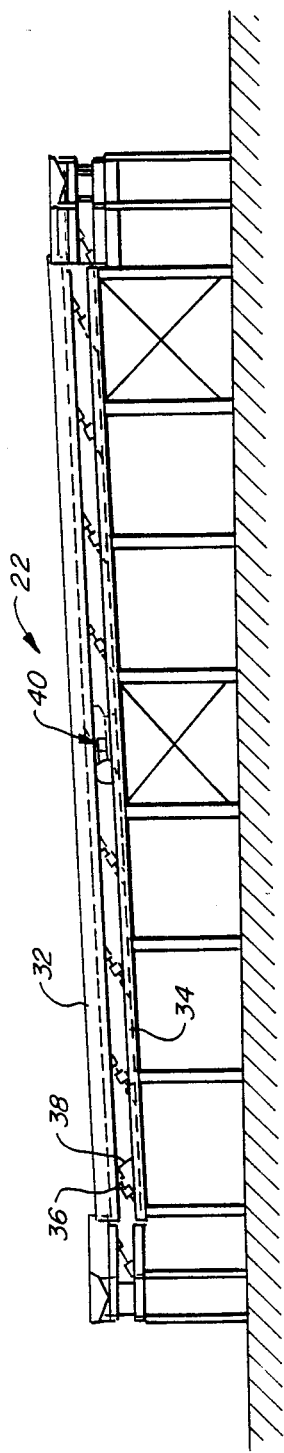
FIG. 3 is a side elevational view of a scrap charge transfer conveyor taken along the line 3—3 of FIG. 1.

As best shown in FIGS. 1 and 2, the weighing and feeding means comprises a weigh feeder station 18 adjacent the receiving point 12 of the transferring means which is adapted to receive scrap as at 20 from a scrap supply for first weighing and then feeding scrap to the receiving point 12 of the transferring means. The scrap transferring means (as best shown in FIGS. 1 and 3) comprises a scrap charge transfer conveyor 22 wherein the receiving point 12 defines a scrap receiving end of the conveyor and the discharge point 14 defines a scrap discharge end of the conveyor. Furthermore, as best shown in FIGS. 1, 4 and 5, the preheating means comprises a preheating station 24 adjacent the discharge point 14 of the transfer conveyor 22 which is adapted to receive scrap from the conveyor for preheating prior to delivery to one of the pair of melting furnaces 16a and 16b.

Figure 4:
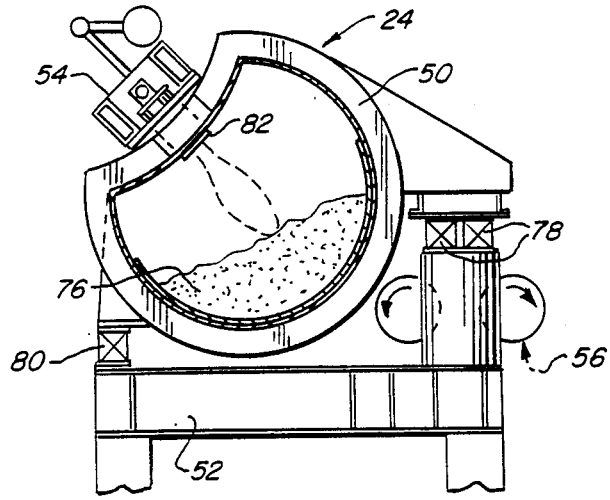
FIG. 4 is a cross-sectional view of a preheating station taken along the line 4—4 of FIG. 1.
Figure 5:
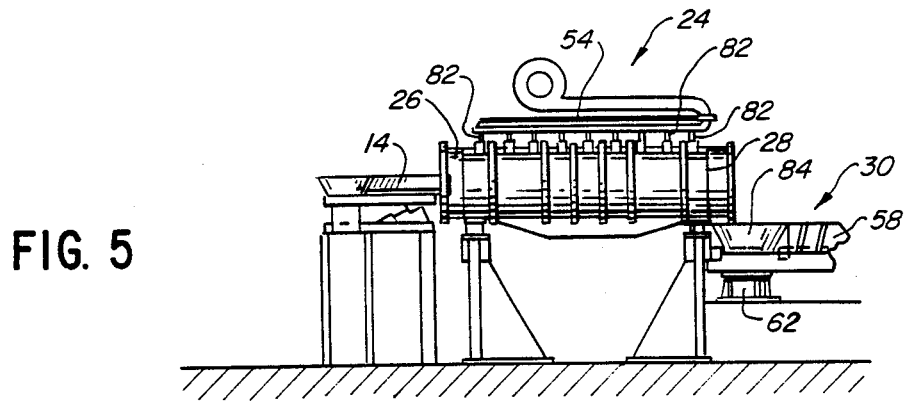
FIG. 5 is a side elevational view of the preheating station taken along the line 5—5 of FIG. 1.

Still referring to FIGS. 1, 4 and 5, the preheating station 24 includes a scrap receiving end 26 for receiving scrap from the discharge point 14 of the transfer conveyor 22 and a scrap discharge end 28 adjacent the receiving and feeding means linking the preheating station 24 to the melting furnaces 16a and 16b. Also, as will be described in greater detail hereinafter, the preheating station 24 includes means for moving scrap from the receiving end 26 to the discharge end 28 thereof. Additionally, and as best shown in FIGS. 1 and 6, the receiving and feeding means comprises a furnace feeder station 30 adjacent the preheating station 24 which receives preheated scrap from the preheating station 24 and alternately feeds preheated scrap to one and then the other of the pair of melting furnaces 16a and 16b.

With the weigh feeder station 18 located at the scrap receiving end 12 of the transfer conveyor 22, it is well suited for continuously feeding scrap onto the transfer conveyor 22 for delivering scrap to the preheating station 24. Also, the preheating station 24 at the scrap discharge end 14 of the transfer conveyor 22 is well suited for continuously receiving scrap from the conveyor and continuously moving scrap from the receiving end 26 to the scrap discharge end 28 of the preheating station 24 while preheating the scrap prior to delivery to one of the pair of melting furnaces 16a and 16b. Similarly, with the furnace feeder station 30 at the discharge end 28 of the preheating station 24, it is well suited for continuously receiving preheated scrap from the preheating station 24 and continuously feeding preheated scrap on an alternating basis to the pair of melting furnaces 16a and 16b.

As best shown in FIG. 3, the transfer conveyor 22 preferably includes a trough 32 supported in spaced relation to a base 34 by a plurality of reaction springs 36 and stabilizer links 38 and a motor and drive assembly 40 is operatively associated with the trough 32 to impart controlled motion for moving scrap from the scrap receiving end 12 to the scrap discharge end 14 thereof. In FIG. 2, the weigh feeder station 18 can be seen to include a hopper 42 supported in spaced relation to a base 44 on scale means 46 for weighing scrap in the hopper 42 and also can be seen to include means such as a motor and drive assembly 48 for imparting controlled motion for moving scrap from the hopper 42 to the scrap receiving end 12 of the transfer conveyor 22. Still further, as best shown in FIGS. 4 and 5, the preheating station 24 can be seen to include a drum 50 supported in spaced relation to a base 52, an independently supported preheat burner hood 54 associated with the drum 50, and means such as a motor and drive assembly 56 (schematically illustrated) for imparting controlled motion for moving scrap from the drum 50 to the furnace feeder station 30.

Figure 6:
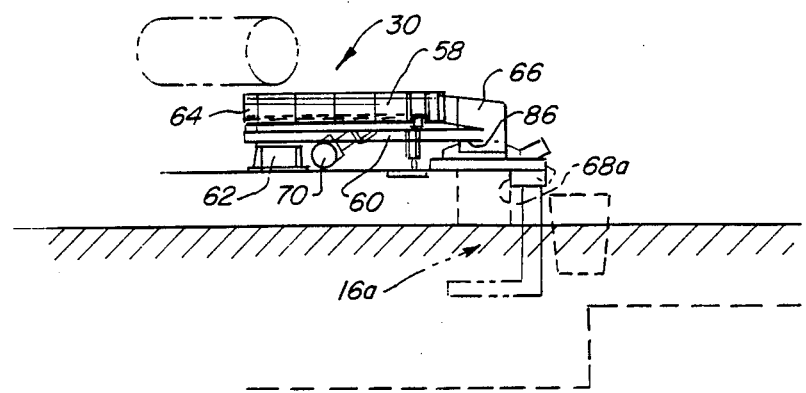
FIG. 6 is a side elevational view of a furnace feeder station taken along the line 6—6 of FIG. 1.

Referring now specifically to FIGS. 1 and 6, the furnace feeder station 30 includes a pivoting furnace feeder 58 supported on a powered pivot frame 60 mounted for pivotal movement as at 62 at the discharge end 28 of the preheating station 24. The pivoting furnace feeder 58 has a scrap receiving end 64 adapted to receive scrap from the scrap discharge end 28 of the preheating station 24 and a scrap discharge end 66 adapted to pivot between intakes 68a and 68b of the pair of melting furnaces 16a and 16b. With this arrangement, the furnace feeder station 30 also includes means such as a motor and drive assembly 70 for imparting controlled motion for moving scrap from the preheating station 24 to the pair of melting furnaces 16a and 16b.

While not specifically shown, those skilled in the art will understand that there will be various electronic controls for the continuous preheat charging system 10 which will, for instance, control the operation of the motor and drive assemblies 40, 48, 56 and 70. As will be appreciated by those skilled in the art, the electronic controls can be set to momentarily interrupt the continuous feed of preheated scrap as the pivoting furnace feeder 58 moves from one to the other of the pair of melting furnaces 16a and 16b.

Typically, this will occur after delivery of the requisite amount of scrap as determined by the weigh and feed station 18 which ca similarly be electronically linked to the remainder of the continuous preheat charging system 10 to signal for the electronic controls to interrupt the continuous feed of preheated scrap at the appropriate time. Of course, the electronic controls can also monitor the temperature in the preheating station 24 and adjust the operation of the independently supported preheat burner hood 54 to insure preheating scrap to a preselected temperature for safe delivery to the pair of melting furnaces 16a and 16b.

As shown in FIG. 1, the pair of melting furnaces 16a and 16b, which are suitably induction furnaces for the melting of metals, can be positioned in a suitable furnace pit 72. The exact position of the intakes 68a and 68b of the induction furnaces 16a and 16b will be such as to lie on the arc scribed by the scrap discharge end 66 of the pivoting furnace feeder 58 when the pivoting furnace feeder 58 is pivoted about the support 62. In this manner, the scrap discharge end 66 of the pivoting furnace feeder 58 will be alignable with the intakes 68a and 68b of the induction furnaces 16a and 16b for delivery of preheated scrap directly thereinto.

Referring to FIG. 2, the motor and drive assembly 48 can be any of a number of conventional vibratory devices of a type known in the art. Similarly, the scale means 46 can be conventional for weighing scrap in the hopper 42 prior to delivery to the scrap receiving end 12 of the transfer conveyor 22. As shown in FIG. 2, the scrap as at 20 can be delivered to the hopper 42 by means of a crane and magnet assembly generally designated 74.

As shown in FIGS. 4 and 5, the independently supported preheat burner hood 54 is mounted substantially directly opposite the position of a live load of scrap as at 76. It will be noted that, by reason of the resilient mountings as at 78 and 80 coupled with the motor and drive assembly schematically illustrated at 56, the live load of scrap as at 76 will have its surface lying in an inclined plane relative to the horizontal substantially entirely along the elongated axially extending preheat station 24. With this arrangement, the independently supported preheat burner hood 54 will include a plurality of burners 82 extending substantially entirely between the scrap receiving end 26 and the scrap discharge end 28 thereof.

Preferably, the furnace feeder station 30 will include a chute 84 at the scrap receiving end 64 thereof as shown in FIG. 5. This will direct preheated scrap onto the pivoting furnace feeder 58 for delivery to the scrap discharge end 66 which is defined by another chute 86 adapted to direct preheated scrap directly into the intakes 68a and 68b of the induction furnaces 16a and 16b.

In this manner, all of the scrap entering the preheating station 24 will find its way to one of the pair of induction furnaces 16a and 16b.

As will be appreciated from the foregoing, the present invention is also directed to a continuous preheat charging method. The method includes the steps of transferring scrap from a receiving point to a discharge point, preheating scrap adjacent the discharge point prior to delivery of preheated scrap to one of a pair of melting furnaces, and alternately feeding preheated scrap to the pair of melting furnaces. Additionally, scrap is preferably weighed adjacent the receiving point and weighed scrap is fed to the receiving point for transfer to the discharge point.

Advantageously, scrap is continuously transferred from the receiving point to the discharge point and is continuously preheated prior to delivery to the furnaces. The scrap is also continuously fed on an alternating basis to the pair of furnaces. Additionally, the continuous feed of preheated scrap is preferably momentarily interrupted to switch feed of preheated scrap from on to the other of the pair of furnaces.

While in the foregoing there has been set forth a preferred embodiment of the invention, it will be appreciated by those skilled in the art that the details herein give may be varied without departing from the spirit and scope thereof as defined by the appended claims

We claim:

1. A continuous preheat charging system, comprising:
    means for transferring scrap from a receiving point to a discharge point;
    means for preheating scrap adjacent said discharge point of said transferring means prior to delivery of preheated scrap to one of a pair of melting furnaces; and
    means for receiving preheated scrap from said preheating means and directly and substantially continuously feeding preheated scrap to said pair of melting furnaces on an alternating basis.

2. The continuous preheated charging system as defined in claim 1 including means for weighing scrap adjacent said receiving point of said transferring means and feeding weighed scrap to said receiving point of said transferring means.

3. The continuous preheat charging system as defined by claim 2 wherein said weighing and feeding means is a weigh feeder station adjacent said receiving point of said transferring means and adapted to receive scrap from a scrap supply for first weighing and then feeding scrap to said receiving point of said transferring means.

4. The continuous preheat charging system as defined by claim 1 wherein said scrap transferring means is a scrap charge transfer conveyor and said receiving point is a scrap receiving end of said transfer conveyor and said discharge point is a scrap discharge end of said transfer conveyor.

5. The continuous preheat charging system as defined by claim 1 wherein said preheating means is a preheating station adjacent said discharge point of said transferring means and adapted to receive scrap from said transferring means for preheating prior to delivery to one of said pair of melting furnaces.

6. The continuous preheat charging system as defined by claim 5 wherein said preheating station includes a scrap receiving end for receiving scrap from said discharge point of said transferring means and a scrap discharge end adjacent said receiving and feeding means and including means for moving scrap from said receiving end to said discharge end of said preheating station.

7. The continuous preheat charging system as defined in claim 1 wherein said receiving and feeding means is a furnace feeder station adjacent said preheating means and said furnace feeder station receives preheated scrap from said preheating means and alternately feeds preheated scrap to said pair of melting furnaces.

8. A continuous preheat charging system, comprising:
    a scrap charge transfer conveyor having a scrap receiving end and a scrap discharge end;
    a weigh feeder station at said scrap receiving end of said transfer conveyor, said weigh feeder station receiving scrap from a supply thereof and weighing scrap received from said supply, said weigh feeder station being adapted to continuously feed scrap onto said scrap receiving end of said transfer conveyor;
    a preheating station at said discharge end of said transfer conveyor, said preheating station having a scrap receiving end for continuously receiving scrap from said scrap discharge end of said transfer conveyor for preheating prior to delivery of one of a pair of melting furnaces, and including means for continuously moving scrap from said receiving end to a scrap discharge end of said preheating station; and
    a furnace feeder station at said discharge end of said preheating station, said furnace feeder station directly and substantially continuously receiving preheated scrap from said preheating station for delivery to either of said pair of melting furnaces, said furnace feeder station being adapted to directly and substantially continuously feed preheated scrap to said pair of melting furnaces on an alternating basis.

9. The continuous preheat charging system as defined by claim 8 wherein said transfer conveyor includes a trough supported in spaced relation to a base by a plurality of reaction springs and stabilizer links and a motor and drive assembly operatively associated with said trough to impart controlled motion for moving scrap from said scrap receiving end to said scrap discharge end thereof.

10. The continuous preheat charging system as defined by claim 8 wherein said weigh feeder station includes a hopper supported in spaced relation to a base on scale means for weighing scrap in said hopper and also includes means for imparting controlled motion for moving scrap from said hopper to said scrap receiving end of said transfer conveyor.

11. The continuous preheat charging system as defined by claim 8 wherein said preheating station includes a drum supported in spaced relation to a base and an independently supported preheat burner hood operatively associated with said drum and also includes means for imparting controlled motion for moving scrap from said drum to said furnace feeder station.

12. The continuous preheat charging system as defined by claim 8 wherein said furnace feeder station includes a pivoting furnace feeder supported on a powered pivot frame, said pivoting furnace feeder having a scrap discharge end adapted to pivot between intakes of said pair of melting furnaces, and also including means for imparting controlled motion for moving scrap from said preheating station to said pair of melting furnaces.

13. The continuous preheat charging system as defined by claim 12 wherein said powered pivot frame is mounted for pivotal movement at said scrap discharge end of said preheating station, said pivoting furnace feeder having a scrap receiving end adapted to receive scrap from said scrap discharge end of said preheating station, and including means for momentarily interrupting the continuous feed of preheated scrap as said pivoting furnace feeder moves from one to the other of said pair of melting furnaces.

14. A continuous preheat charging method, comprising the steps of:
    transferring scrap from a receiving point to a discharge point;
    preheating scrap adjacent said discharge point prior to delivery of preheated scrap to one of a pair of melting furnaces; and
    directly and continuously feeding preheated scrap to said pair of melting furnaces on an alternating basis.

15. The continuous preheat charging method as defined by claim 14 wherein scrap is continuously transferred from said receiving point to said discharge point.

16. The continuous preheat charging method as defined in claim 14 wherein scrap is continuously preheated prior to delivery of preheated scrap to said pair of furnaces.

17. The continuous preheat charging method as defined by claim 14 preheated scrap is continuously fed on an alternating basis to said pair of furnaces.

18. The continuous preheat charging method as defined by claim 17 including the step of momentarily interrupting the continuous feed of preheated scrap to switch feed of preheated scrap from one to the other of said pair of melting furnaces.

19. The continuous preheat charging method as defined by claim 14 including the steps of weighing scrap adjacent said receiving point and feeding weighed scrap to said receiving point for transfer to said discharge point.

20. The continuous preheat charging method as defined by claim 19 wherein weighed scrap is continuously fed to said receiving point for transfer to said discharge point.

21. In a preheat charging apparatus comprising:
    a container having a central axis and a material supporting surface;
    mounting means for resiliently mounting the container for unconstrained vibratory movement relative to a mounting surface,
    vibration generator means for generating vibratory forces along a linear path displaced from the central axis and from a center of gravity of the container on the side of the center of gravity spaced from the central axis,
    said vibration generator means being mounted on the container,
    said vibratory forces vibrating each point on the material supporting surface along segments of circles, each segment having a center at a position spaced from said central axis and from the center of gravity on the side of the central axis spaced from the center of gravity, and
    an independently supported burner hood associated with said container for preheating material being vibrated in said container.

22. In the preheat charging apparatus of claim 21 wherein said burner hood projects through an opening in an upper surface of the container and directs heat unto the material tumbling in said container.

23. A furnace feeder station at the discharge end of a scrap preheating station, said furnace feeder station directly and substantially continuously receiving preheated scrap from said preheating station for delivery to either of a pair of melting furnaces, and including a pivoting furnace feeder supported on a powered pivot frame, said pivoting furnace feeder having a scrap discharge end adapted to pivot between intakes of said pair of melting furnaces, and also including means for imparting controlled motion for directly and substantially continuously moving scrap from said preheating station to said pair of melting furnaces on an alternating basis.

* * * * *

UNITED STATES PATENT AND TRADEMARK OFFICE
CERTIFICATE OF CORRECTION

PATENT NO. : 4,923,177
DATED : May 8, 1990
INVENTOR(S) : Richard B. Kraus and Albert Musschoot It is certified that error appears in the above-identified patent and that said Letters Patent is hereby corrected as shown below:

Column 4, line 17, after "which", correct "ca" to read --can--.
Column 5, line 22, after "from", correct "on to" to read --one to--;
        line 26, correct the first word "give" to read --given--;
        line 27, insert a period (--.--) after "claims";
        line 41 (Claim 2, line 1), after "continuous" correct "preheated" to --preheat--;
        Line 42 (Claim 2, line 2), before "claim" cancel "in" and insert in lieu thereof --by--.
Column 6, line 5 (Claim 7, line 2), cancel the first word "in" and insert in lieu thereof --by--;
        line 21 (Claim 8, line 12), before "discharge", insert --scrap--;
        line 25 (Claim 8, line 16), after "delivery", cancel "of" and substitute therefor --to--.
Column 7, line 24 (Claim 16, line 7), before "claim", cancel "in" and insert in lieu thereof --by--; and
        line 28 (Claim 17, line 2), after "14" insert --wherein--.

Signed and Sealed this

Fifth Day of November, 1991

Attest:

HARRY F. MANBECK, JR.

*Attesting Officer*      *Commissioner of Patents and Trademarks*